3,357,789
PROCESS FOR PREPARING SOLID CUPROUS HALIDE SORBENTS
Edward Allen Hunter, Lake Jackson, Tex., and Warren Alfred Knarr, Baton Rouge, and Robert Joseph Fritz, East Baton Rouge, La., assignors to Esso Research and Engineering Company, a corporation of Delaware
No Drawing. Continuation of application Ser. No. 415,172, Dec. 1, 1964. This application Dec. 14, 1966, Ser. No. 601,806
6 Claims. (Cl. 23—97)

ABSTRACT OF THE DISCLOSURE

Refinery streams having a boiling range of 60 to 330° F. and containing $C_4$-$C_9$ Type I–Type IV monoolefins along with at least one low solubility component of $C_6$-$C_7$ monocyclic aromatics or $C_5$-$C_7$ cyclic monoolefins or mixtures thereof are utilized to form cuprous halide sorbents useful in selectively sorbing olefins from hydrocarbon streams containing them.

CROSS REFERENCE

This application is a continuation of copending application Ser. No. 415,172, filed Dec. 1, 1964, which now stands abandoned.

This invention is directed to an improved process for forming cuprous halide salt solutions using low cost mixtures of hydrocarbon solvents containing individual components having low solubility for cuprous halide salts, the novel solutions thus formed and the use of said low solubility components-containing solutions to form activated cuprous halide sorbents eminently useful in selectively sorbing olefins from hydrocarbon streams containing them. Characteristically these low cost hydrocarbon solvent mixtures contain $C_4$ to $C_9$ alpha olefins in appreciable amounts, i.e., from 10 to 40 wt. percent.

More specifically, the present invention is directed to an improved process for forming cuprous halide salt solutions useful to form active cuprous halide olefin sorbents by dissolving said cuprous salide salt(s) in a hydrocarbon solvent mixture comprising light hydrocarbon refinery streams generally comprising $C_5$, $C_6$ and $C_7$ acyclic monoolefins of Types I to IV, $C_5$ to $C_7$ cyclic monoolefins, aromatic hydrocarbons (i.e., usually monocyclic aromatics, e.g., benzene and alkylated benzene), paraffins and polyolefins (chiefly $C_4$ to $C_8$ diolefins) with the latter four types of components, viz, cyclic olefins, aromatics, paraffins, and polyolefins being the chief low solubility components. Usually these hydrocarbon mixtures contain some monocyclic aromatics, and said aromatics can constitute a major portion, viz, >50 wt. percent, of said mixtures. Acyclic $C_4$-$C_9$ monoolefins (Types I to IV) are always present and can constitute the predominant or even the major component of the solvent mixture, but the presence of cyclic olefins, paraffins and polyolefins is optional. Cyclic olefins can constitute a predominant or even the major component of the solvent mixture.

These refinery streams have characteristic boiling ranges of from about 60 to about 330° F. and usually from about 70 to about 320° F., and are fractions usually derived from thermal cracking, catalytic cracking and more particularly steam cracking procedures. The cracking feeds can be, e.g., naphthas, gas oils, waxes or petrolatums.

This solution is then contacted with a suitable ligand-containing compound capable of forming a stable complex with said cuprous salt having a mole ratio of copper to complexing compound greater than 1:1, which complex is preferably at least partially insoluble in said solvent mixture. The cuprous halide complex thus formed is then decomplexed by heating it to thermally remove the ligand-containing complexing moiety thereby activating the sorbent. The activated sorbent is then contacted with an olefin-containing hydrocarbon stream to selectively sorb and thereby remove said olefin therefrom. The sorbed olefin can then be recovered from the sorbent by heating the complex to a temperature such that the partial pressure of the complexing moiety in equilibrium with the complex is greater than the partial pressure of the complexing moiety in contact with the complex.

The terms "sorbent," "sorbing" and similar terminology as used herein are employed to include both adsorption and absorption. The term "ligand" as employed herein is intended to denote the presence of a compound containing a functional group capable of forming stable copper complexes having a mole ratio of copper to complexing compound greater than 1:1 and preferably 2:1 or higher. Such compounds include both materials which form only complexes having said ratios of copper to complexing compound greater than 1:1 and compounds which form complexes having a ratio of 1:1 or less which upon decomplexing pass through a stable complex having a ratio of copper to complexing compound greater than 1:1. Thus, certain materials, e.g. nitriles, diolefins, acetylenes, carbon monoxide under ordinary conditions forming a 2:1 complex can be made to complex in ratios of copper to complexing compound of 1:1 or less. However, upon dissociation, complexing material is released selectively from the bed of cuprous halide until the stable complex viz the complex having a copper to complexing moiety ratio above 1:1, e.g. 2:1 stoichiometric complex, is completely formed before further decomplexing to the uncomplexed cuprous halide occurs. In this specification by "stable complex" is meant a stoichiometric complex stable upon dissociation as described in the preceding sentence. Such complexing agents (ligands) as contemplated herein are carbon monoxide, organic nitriles and HCN, organic compounds having an acetylenic group, i.e., as present in acetylene, and polyolefins, i.e., especially diolefins, e.g., butadiene, isoprene, etc. More than one of these functional groups can be present in a single molecule of the complexing compound. In addition, the complexing compound can contain other functional groups so long as they do not interfere with complex formation.

The cuprous halide salts whose use is contemplated herein are cuprous chloride, cuprous bromide, and cuprous iodide. In accordance with this invention, the commercially available cuprous halide salts referred to above can be used, viz, cuprous halide salts having a purity of at least about 75%. Usually the purity of the cuprous halide salt ranges from 85 to 100%. It is preferable, however, to employ cuprous halide salts having a percent purity of at least 99%, and having a moisture content preferably not in excess of 0.5% (based on dry cuprous halide salt).

The hydrocarbon solvent mixtures suitable for use according to this invention contain the below listed components, including low solubility components (components having a low solubility tolerance for cuprous halide salts) and within the weight concentration ranges tabulated hereinbelow.

CONCENTRATIONS (WT. PERCENT)

| Components | Characteristic | Usual | Preferred |
|---|---|---|---|
| Type I Olefins | 10–40 | 15–30 | 18–26 |
| Type II (cis) Olefins | 1–25 | 2–20 | 3–18 |
| Type II (trans) Olefins | 1–25 | 2–20 | 3–16 |
| Type III Olefins | 0.5–40 | 1–30 | 1–26 |
| Type IV Olefins | 0.05–40 | 0.1–35 | 0.1–30 |
| Cyclic Olefins | 0–70 | 0–65 | 0.5–60 |
| Aromatics | 0.5–70 | 1–70 | 1.5–65 |
| Paraffins | 0–10 | 0–8 | 0–6 |
| Polyolefins (mostly diolefins) | 0–8 | 0–7 | 0–6 |

From the foregoing table of component concentrations it can be seen that the hydrocarbon solvent mixture can consist, in its essential components, of 82–100 wt. percent of $C_4$–$C_9$ Type I–Type IV monoolefins and either or both of $C_6$–$C_7$ monocyclic aromatics and $C_5$–$C_7$ cyclic monoolefins, and 0–18 wt. percent of the solvent mixture can be polyolefins or paraffins or mixtures thereof.

When diolefins are present in concentrations substantially exceeding 0.8 wt. percent in said streams, some initial loss of dissolved cuprous salt usually occurs due to complex formation between said cuprous salt and said diolefins. These complexes are frequently insoluble. Hence when directly employing refinery streams containing such concentrations of dioelfins without pretreatment to reduce the diolefin content, it is frequently desirable to clarify the solution to remove the insoluble complex which is of undesirable particle size, i.e., <20 microns, prior to the addition of the desired ligand and formation of desired particle sizes, viz >50 microns and above. The cuprous halide salt can be recovered from the prematurely formed cuprous halide-diolefin complex by desorption (heating) to remove the dioelfin(s) therefrom.

Alternatively the diolefin content of said refinery streams can be effectively reduced to a level sufficiently low, i.e. below about 0.8 wt. percent, before dissolving the cuprous halide salt therein thus obviating premature formation of cuprous halide complex. Conventional procedures can be used to reduce the diolefin content, e.g. by selective hydrogenation of diolefins to convert them to monoolefins having the same number of carbon atoms.

When these refinery streams are used directly to dissolve the cuprous halide salt in a single stage solvating procedure, e.g., without conversion of diolefins to monoolefins, the diolefin content thereof characteristically ranges from 0.8–0.0 wt. percent, usually ranges from 0.6–0.0 wt. percent, and preferably ranges from 0.5–0.0 wt. percent.

The cuprous halide solutions are formed conveniently by contacting the cuprous halide salts, e.g., cuprous chloride, with the solvent mixture using mild agitation at temperatures which can range from about −50 to +70° F. Usually, temperatures of −40 to +60° F. are employed to dissolve the cuprous halide salts into solution, and preferably the temperature range from about −30 to +55° F.

Prior to the present invention, the generally accepted procedure for forming cuprous halide salt solutions, suitable for use in preparing cuprous halide sorbents, was to dissolve the cuprous halide salts in a single monoolefin-containing compound which generally was a $C_4$ monoolefin, e.g., butene-1, isobutylene. Therefore, the discovery of the present invention that good cuprous halide sorbents can be prepared using low cost solvent mixtures containing a wide variety of hydrocarbons including low solubility components was most surprising. This is especially true in view of the fact that the low solubility components can be present in appreciable amounts (as noted in the typical hydrocarbon solvent mixture tabulated hereinabove). These low solubility materials were previously believed to be very unsatisfactory for use in sorbent preparation. Consequently, prior to the present invention, it was the widespread belief in the art that such low solubility components must be excluded from the solvents employed to dissolve the cuprous halide salts.

After dissolving the cuprous halide salt(s) in the solvent mixture, this cuprous halide solution is then usually filtered using a Cuno, Sparkler, or other conventional filter to remove insoluble and undissolved salts therefrom.

Then the filtered cuprous halide-solvent mixture solution is contacted with a suitable complex-forming compound, preferably by passing the complex-forming compound into the cuprous halide-solvent mixture solution at temperatures ranging from about −40 to +20° F. employing complexing pressures ranging from about 0 to 50 p.s.i.g. for contact time periods ranging from about 30 to 240 minutes. It has been found helpful to control the rate of addition of the complexing compound to a value ranging from about 90 to 150% of the stoichiometric requirement for complete complex formation.

As mentioned herein above, it is preferable to employ a complexing compound which forms an insoluble complex in the solvent mixture employed to dissolve the cuprous halide salt. Suitable complexing compounds which can be listed as exemplary of those suitable for use in the present invention include, but are not limited to, the following: $C_3$–$C_{10}$ conjugated or nonconjugated aliphatic cyclic or acyclic polyolefins, e.g., butadiene-1,3, isoprene, piperylene, allene, isoprene, octadienes, cyclohexadienes, cyclooctadienes, divinylbenzene, cyclododecatriene, cyclooctatetraene; $C_2$–$C_{10}$ aliphatic or alicyclic acetylenes or acetylenes containing additional unsaturation, e.g., acetylene, methylacetylene, propylacetylenes, phenylacetylene, vinylacetylene, etc.; $C_2$–$C_{10}$ or higher unsaturated or saturated aliphatic or alicyclic nitriles, e.g., acetonitrile, acrylonitrile, propionitrile, phenylnitrile, methacrylonitrile, ethacrylonitrile, etc., can likewise be used. The preferred complexing agent is butadiene.

Butadiene, either in pure or dilute form (e.g., diluted with an inert gas, e.g., nitrogen, methane, etc.) or naturally dilute butadiene-containing petroleum streams, e.g., butadiene diluted with butane and butenes, can be employed so long as the diluent does not interfere with the precipitation of the desired solid cuprous halide-butadiene complex. When the complexing agent is butadiene, the temperature at which the butadiene is contacted with the cuprous halide solution usually range from about −40 to +20° F. In such cases, the butadiene is passed in gaseous form (diluted or undiluted with other inert gases as mentioned above) into the previously dissolved cuprous halide solution, at a butadiene addition rate ranging from 0.05 to 0.5 gram per hour per gram of dissolved cuprous halide salt. After complete precipitation thereof, the precipitated cuprous halide-butadiene complex is passed in the form of a slurry to a suitable deliquefying device, such as a centrifuge, hydroclone, or other equivalent deliquefying apparatus.

The partially deliquefied cuprous halide-butadiene-complex is then collected, usually in the form of a wet cake, and passed to a suitable decomplexing (activating) device wherein the newly formed complex is heated at temperatures ranging from 120 to 200° F., usually from 140 to 190° F. and preferably from 150 to 190° F., to thermally drive off the butadiene (or other complexing moiety) leaving the cuprous halide sorbent particles in an activated condition suitable for direct use in selectively sorbing olefins from hydrocarbon streams containing them.

At the conclusion of the activated procedure, the cuprous halide sorbent particles have the following typical physical properties:

Physical properties: Values
- Surface area _____ m.²/gram__ 4–10
- Pore volume (550–10,000 A. pores)
  cc./gram _____ 0.028 to 0.210

Typical size distribution (microns):
- 0–10 _____ wt. percent__ 2.0
- 10–20 _____ do____ 2.8
- 20–50 _____ do____ 13.1
- 50–80 _____ do____ 67.7
- 80–110 _____ do____ 11.7
- 110+ _____ do____ 2.7

In accordance with this invention, it has been observed that the improved cuprous halide-sorbent mixture solutions prepared as indicated above, lead to the formation of active cuprous halide sorbents which can remove selectively essentially all (e.g., 95% and more) of the olefin present in and sought to be selectively removed from hydrocarbon streams containing such an olefin(s). This is true even when the olefin is present in said hydrocarbon streams in concentrations as low as about 15 to 20 wt. percent (based on total hydrocarbon stream). Of course, the sorbent prepared from said cuprous halide solutions likewise removes essentially all of the desired olefin to be isolated when the olefin is present in higher concentrations in the hydrocarbon stream. This invention is especially useful in preparing sorbents which are employed to remove butadiene from hydrocarbon streams containing about 25 to 60+ wt. percent butadiene.

Use of the novel cuprous halide-solvent mixture solutions according to this invention offers marked economic advantages compared with the prior art use of pure alpha-olefins as solvents for the cuprous halide since the solvent mixtures employed in this invention are far less expensive than pure alpha olefin solvents or mixtures of 2 or perhaps 3 of such pure solvent materials, all of which show high solubility for cuprous chloride.

This invention will be illustrated further in greater detail by the following examples.

Example 1

The hydrocarbon solvent comprises a light fraction from a steam cracked naphtha which has been partially freed of aromatics and active diolefins and has the following typical inspections (properties and compositional analysis).

DISTILLATION

Percent fraction: °F.
- Initial _____ 81
- 5 _____ 115
- 50 _____ 135
- 95 _____ 170
- Final _____ 193

OLEFIN TYPE (IR)

Type: Percent
- I _____ 23.45
- II$_{trans}$ _____ 14.92
- II$_{cis}$ _____ 12.54
- III _____ 22.82
- IV _____ 26.27

COMPOUND DISTRIBUTION (MASS SPECTROGRAPHIC ANALYSIS)

Compounds: Wt. percent
- Monoolefins _____ 36.6

- $C_5$ _____ 17.8
  - $C_6$ _____ 18.1
  - $C_7$ _____ 0.7

- Cycloolefins _____ 53.1

- $C_5$ _____ 36.8
  - $C_6$ _____ 15.8
  - $C_7$ _____ 0.5

- Polyolefins _____ 5.0

- $C_5$ _____ 3.0
  - $C_6$ _____ 2.0
  - $C_7$ _____ Trace

- Aromatics _____ 5.3

- $C_6$ _____ 5.3
  - $C_7$ _____ Trace

- Paraffins _____ (maximum)__ 2.7

Bromine number, 163.7.

One thousand grams of the hydrocarbon solvent mixture above tabulated were mixed with 100 grams of cuprous chloride powder (99.5% purity and containing approximately 0.1% moisture). The mixture was cooled to approximately 14° F. and then agitated for approximately 2 hours. While agitation was continued at the same temperature, the solution of cuprous halide thus formed was filtered using a glass wool filter. The filtered solution was then passed to a stirred reactor. Over a two-hour period about 150% of the stoichiometric complexing amount of butadiene (approximately 37 gms.) required to react with the cuprous chloride present in solution was bled into contact with the cuprous chloride solution. After the two-hour reaction period (butadiene feed rate of about 0.2 gram/hour/gram of cuprous chloride salt dissolved) the precipitated cuprous chloride-butadiene complex was filtered and dried in a Buchner funnel using a stream of butadiene, at ambient temperature.

The dried cuprous chloride-butadiene complex was then charged to a decomplexing unit where it was heated to 176° F. for 0.5 hour. The resulting activated sorbent was then contacted with a petroleum refinery hydrocarbon stream containing approximately 33 wt. percent of butadiene. The contacting was conducted over two cycles (sorbing-desorbing cycles). The desorption of the sorbed butadiene was conducted by fluidizing with a stream of dry nitrogen while heating to about 180° F. Over these two cycles the cuprous chloride sorbent sorptive capacity was respectively 75.4 and 76.1% of the theoretical capacity. This performance compares quite favorably with cuprous chloride sorbent prepared using butene-1 and isobutylene, respectively, as cuprous chloride solvents.

This is in sharp contrast to what would normally be expected employing solvents containing the low solubility components avoided by the prior art. The fluidization characteristics of the cuprous halide particles prepared from the cuprous chloride-solvent mixture compositions of the present invention were good and fluidization activity appeared the same as when the sorbent was formed from cuprous chloride dissolved in either butene-1 or isobutylene, respectively.

The size of the sorbent particles formed from the cuprous chloride-solvent mixture compositions of this invention was surprisingly good, since approximately 82% of the active cuprous chloride particles were of a size greater than 50 microns.

Example 2

The procedure of Example 1 was repeated only using the hydrocarbon solvent mixture set forth below.

A similar light refinery stream was derived from that of Example 1 by removing more of the residual aromatics and parraffins.

ANALYSIS

| Components: | Concentration (wt. percent) |
|---|---|
| Acyclic monoolefins | 51.0 |
| Cyclic olefins | 41.9 |
| Aromatics | 2.3 |
| Polyolefins | 4.8 |
| Paraffins (maximum) | 0.2 |
| Bromine No. 190.7. | |

This hydrocarbon solvent was found to be capable of dissolving up to 9.3 wt. percent of CuCl at 0° F. and 8.0 wt. percent at 32° F.

On testing for two sorption-desorption cycles using the same conditions mentioned in Example 1, the active cuprous halide sorbent catalyst had 77.7 and 78.6%, respectively, of theoretical capacity. Fluidization in the unsupported fluidized bed was excellent and sorbent activity was good. 98% of the active cuprous chloride particles formed using the solution tabulated above were a particle size greater than 20 microns, and 57% thereof were particle size greater than 50 microns.

*Example 3*

The hydracarbon solvent employed was the raffinate from a resin plant feed. The hydrocarbon raffinate stream had the following typical inspection.

| Compound: | Wt. percent |
|---|---|
| $C_5$ type olefin— | |
| I | 4.7 |
| II (cis) | 1.7 |
| II (trans) | 1.7 |
| III | 0.5 |
| IV | 0.5 |
| $C_5$ cyclic olefins | 1.8 |
| $C_6$ type olefin— | |
| I | 9.5 |
| II (cis) | 5.1 |
| II (trans) | 2.5 |
| III | 1.2 |
| $C_7$ type olefin— | |
| I | 5.0 |
| II (trans) | 1.4 |
| III | 0.5 |
| $C_8$ type olefin— | |
| I | 2.1 |
| II (trans) | 1.2 |
| III | 0.7 |
| Benzene | 45.6 |
| Toluene | 13.4 |
| Diolefins | 0.6 |

This stream was found to be capable of dissolving 6 wt. percent CuCl at 50° F.

The active cuprous chloride sorbent prepared from this cuprous chloride solution had a sorptive capacity of 78% of theoretical. This sorbent had 97.7% of its particles >20 microns in size, and 56.5% of the particles had a particle size >50 microns.

While the present invention has been illustrated in great detail in the foregoing examples, it should be understood that the present invention in its broadest aspects is not necessarily limited to the specific solvents, processing conditions, etc., set forth in these examples as this invention is limited only by the claims appended hereto.

What is claimed is:

1. A process for preparing solid cuprous halide sorbents which comprises:
  (A) dissolving a cuprous halide salt containing not in excess of 0.5 wt. percent moisture and selected from the group consisting of (1) cuprous chloride, (2) cuprous bromide, and (3) cuprous iodide in a hydrocarbon solvent mixture having a boiling range of from about 60 to about 330° F., and consisting in its essential components of $C_4$ to $C_9$ Type I to Type IV monoolefins and at least one low solubility component selected from the group consisting of (1) $C_6$ to $C_7$ monocyclic aromatics, (2) $C_5$ to $C_7$ cyclic monoolefins, and (3) mixtures of (1) and (2), said essential components constituting from 82 to 100 wt. percent of said solvent mixture with from 0 to 18 wt. percent thereof being selected from the group consisting of (1) polyolefins, (2) paraffins, and (3) mixtures of polyolefins and paraffins, the total components approximating 100 wt. percent of said hydrocarbon solvent mixture, at temperatures of about −50 to about 70° F.;
  (B) contacting said cuprous halide solution at temperatures of about −40 to about 20° F. with a complex forming compound capable of forming a stable complex with said cuprous halide having a mol ratio of copper to complexing compound greater than 1:1 to form a stable cuprous halide complex which is at least partly insoluble in said hydrocarbon solvent mixture;
  (C) recovering said cuprous halide complex and
  (D) desorbing said complex by heating to thereby produce an active cuprous halide sorbent.

2. A process as in claim 1 wherein said cuprous halide is cuprous chloride.

3. A process as in claim 1 wherein said complex forming compound is butadiene.

4. A process as in claim 2 wherein the predominant essential hydrocarbon solvent component is composed of $C_6$ to $C_7$ monocyclic aromatics.

5. A process as in claim 2 wherein the predominant essential hydrocarbon solvent component is composed of $C_5$ to $C_7$ cyclic monoolefins.

6. A process as in claim 2 wherein the predominant essential hydrocarbon solvent component is composed of $C_4$ to $C_9$ Type I to Type IV monoolefins.

No references cited.

OSCAR R. VERTIZ, *Primary Examiner.*

EDWARD STERN, *Examiner.*